(12) United States Patent
Kottomtharayil et al.

(10) Patent No.: US 9,930,118 B2
(45) Date of Patent: *Mar. 27, 2018

(54) SYSTEMS AND METHODS FOR GRANULAR RESOURCE MANAGEMENT IN A STORAGE NETWORK

(71) Applicant: Commvault Systems, Inc., Tinton Falls, NJ (US)

(72) Inventors: Rajiv Kottomtharayil, Marlboro, NJ (US); Parag Gokhale, Marlboro, NJ (US); Marcus S. Muller, Maynard, MA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/080,186

(22) Filed: Mar. 24, 2016

(65) Prior Publication Data

US 2016/0277499 A1    Sep. 22, 2016

Related U.S. Application Data

(63) Continuation of application No. 14/018,014, filed on Sep. 4, 2013, now Pat. No. 9,313,143, which is a
(Continued)

(51) Int. Cl.
*G06F 12/00*       (2006.01)
*G06F 13/00*       (2006.01)
(Continued)

(52) U.S. Cl.
CPC .......... *H04L 67/1097* (2013.01); *H04L 12/66* (2013.01); *H04L 47/70* (2013.01)

(58) Field of Classification Search
CPC ... G06F 17/30082; H04L 12/66; H04L 47/70; H04L 67/1097
(Continued)

(56) References Cited

U.S. PATENT DOCUMENTS 4,084,231 A    4/1978  Capozzi et al.
4,267,568 A    5/1981  Dechant et al.
(Continued)

FOREIGN PATENT DOCUMENTS

EP         0259912     3/1988
EP         0405926     1/1991
(Continued)

OTHER PUBLICATIONS

Arneson, "Mass Storage Archiving in Network Environments" IEEE, 1998, pp. 45-50.
(Continued)

*Primary Examiner* — Sheng-Jen Tsai
(74) *Attorney, Agent, or Firm* — Knobbe, Martens, Olson & Bear, LLP

(57) ABSTRACT

In accordance with some aspects of the present invention, systems and methods are provided for dynamically and/or automatically selecting and/or modifying data path definitions that are used in performing storage operations on data. Alternate data paths may be specified or selected that use some or all resources that communicate with a particular destination to improve system reliability and performance. The system may also dynamically monitor and choose data path definitions to optimize system performance, conserve storage media and promote balanced load distribution.

20 Claims, 5 Drawing Sheets

Related U.S. Application Data continuation of application No. 11/640,144, filed on Dec. 15, 2006, now Pat. No. 8,572,330.

(60) Provisional application No. 60/752,198, filed on Dec. 19, 2005.

(51) Int. Cl.
  *G06F 13/28* (2006.01)
  *H04L 29/08* (2006.01)
  *H04L 12/66* (2006.01)
  *H04L 12/911* (2013.01)

(58) Field of Classification Search
  USPC .................................................. 711/154
  See application file for complete search history.

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,438,595 B1* | 8/2002 | Blumenau ........... G06F 9/5083 709/226 | |
| 6,542,972 B2 | 4/2003 | Ignatius et al. | |
| 6,574,667 B1* | 6/2003 | Blumenau .............. G06F 9/505 709/229 | |
| 6,658,436 B2 | 12/2003 | Oshinsky et al. | |
| 6,691,209 B1* | 2/2004 | O'Connell ........... G06F 3/0604 700/200 | |
| 6,721,767 B2 | 4/2004 | De Meno et al. | |
| 6,760,723 B2 | 7/2004 | Oshinsky et al. | |
| 6,792,472 B1* | 9/2004 | Otterness ............... H04L 29/06 709/239 | |
| 7,003,641 B2 | 2/2006 | Prahlad et al. | |
| 7,007,189 B2* | 2/2006 | Lee .......................... H04L 45/22 710/38 | |
| 7,035,880 B1 | 4/2006 | Crescenti et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,231,391 B2 | 6/2007 | Aronoff et al. | |
| 7,246,207 B2 | 7/2007 | Kottomtharayil et al. | |
| 7,275,103 B1* | 9/2007 | Thrasher ................. H04L 45/22 709/223 | |
| 7,290,168 B1* | 10/2007 | DeKoning ............ H04L 67/1097 714/5.11 | |
| 7,315,923 B2 | 1/2008 | Retnamma et al. | |
| 7,343,453 B2 | 3/2008 | Prahlad et al. | |
| 7,389,311 B1 | 6/2008 | Crescenti et al. | |
| 7,395,282 B1 | 7/2008 | Crescenti et al. | |
| 7,440,982 B2 | 10/2008 | Lu et al. | |
| 7,454,569 B2 | 11/2008 | Kavuri et al. | |
| 7,490,207 B2 | 2/2009 | Amarendran et al. | |
| 7,500,053 B1* | 3/2009 | Kavuri .................. G06F 3/0605 709/226 | |
| 7,529,782 B2 | 5/2009 | Prahlad et al. | |
| 7,536,291 B1 | 5/2009 | Vijayan Retnamma et al. | |
| 7,543,125 B2* | 6/2009 | Gokhale ............ G06F 11/1461 711/154 | |
| 7,546,324 B2 | 6/2009 | Prahlad et al. | |
| 7,603,386 B2 | 10/2009 | Amarendran et al. | |
| 7,606,844 B2 | 10/2009 | Kottomtharayil | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,747,579 B2 | 6/2010 | Prahlad et al. | |
| 7,801,864 B2 | 9/2010 | Prahlad et al. | |
| 7,809,914 B2 | 10/2010 | Kottomtharayil et al. | |
| 8,170,995 B2 | 5/2012 | Prahlad et al. | |
| 8,229,954 B2 | 7/2012 | Kottomtharayil et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,423,634 B2* | 4/2013 | Drees .................. G06F 11/3476 709/224 | |
| 8,572,330 B2 | 10/2013 | Kottomtharayil et al. | |
| 8,578,120 B2 | 11/2013 | Attarde et al. | |
| 2001/0034812 A1* | 10/2001 | Ignatius ................ G06F 3/0605 711/112 | |
| 2002/0103889 A1* | 8/2002 | Markson ............. H04L 67/1097 709/223 | |
| 2003/0005119 A1* | 1/2003 | Mercier ................ G06F 3/0601 709/225 | |
| 2003/0023893 A1* | 1/2003 | Lee ........................... H04L 45/00 714/4.5 | |
| 2003/0126200 A1* | 7/2003 | Wolff ....................... G06F 9/52 709/203 | |
| 2003/0145086 A1* | 7/2003 | O'Reilly .................. H04L 29/06 709/226 | |
| 2003/0236884 A1* | 12/2003 | Yamamoto ......... G06F 17/30067 709/225 | |
| 2004/0006572 A1* | 1/2004 | Hoshino ............... G06F 3/0605 | |
| 2004/0117438 A1* | 6/2004 | Considine ........... G06F 12/2074 709/203 | |
| 2004/0133634 A1* | 7/2004 | Luke ................... G06F 11/2089 709/203 | |
| 2004/0243699 A1* | 12/2004 | Koclanes ............... H04L 29/06 709/224 | |
| 2005/0038954 A1* | 2/2005 | Saliba .................. G06F 3/0607 711/100 | |
| 2005/0044316 A1* | 2/2005 | Kottomtharayil ..... G06F 3/0617 711/115 | |
| 2005/0175341 A1* | 8/2005 | Ovadia ................... H04L 29/06 398/43 | |
| 2005/0188060 A1* | 8/2005 | Meneghini ............ G06F 3/0607 709/220 | |
| 2005/0228835 A1* | 10/2005 | Roa ....................... G06F 3/0605 | |
| 2005/0235132 A1* | 10/2005 | Karr ..................... G06F 3/0607 711/203 | |
| 2005/0246376 A1* | 11/2005 | Lu ........................ G06F 11/1448 | |
| 2005/0246510 A1* | 11/2005 | Retnamma ........... G06F 11/1464 711/162 | |
| 2005/0256961 A1* | 11/2005 | Alon ....................... H04L 29/06 709/229 | |
| 2005/0257062 A1* | 11/2005 | Ignatius ................ G06F 21/6209 713/176 | |
| 2006/0010341 A1* | 1/2006 | Kodama ............... G06F 3/0605 714/6.31 | |

(56) References Cited

U.S. PATENT DOCUMENTS

| | | | |
|---|---|---|---|
| 2006/0224846 A1 | 10/2006 | Amarendran et al. | |
| 2006/0265124 A1* | 11/2006 | Ohler | G01C 21/3415 |
| | | | 701/423 |
| 2007/0088702 A1* | 4/2007 | Fridella | G06F 17/30123 |
| 2007/0130344 A1* | 6/2007 | Pepper | G06F 3/0613 |
| | | | 709/227 |
| 2007/0130373 A1* | 6/2007 | Kalwitz | G06F 3/0607 |
| | | | 710/8 |
| 2007/0198722 A1* | 8/2007 | Kottomtharayil | H04L 47/70 |
| | | | 709/226 |
| 2008/0058971 A1* | 3/2008 | Graham | G06Q 30/02 |
| | | | 700/90 |
| 2008/0147878 A1* | 6/2008 | Kottomtharayil | G06F 17/30082 |
| | | | 709/235 |
| 2008/0250178 A1* | 10/2008 | Haustein | H04L 47/10 |
| | | | 710/107 |
| 2009/0319534 A1 | 12/2009 | Gokhale | |
| 2010/0042427 A1* | 2/2010 | Graham | G06Q 30/02 |
| | | | 705/15 |
| 2011/0090784 A1* | 4/2011 | Gan | H04L 45/28 |
| | | | 370/218 |
| 2012/0131280 A1* | 5/2012 | Iwasaki | G06F 3/065 |
| | | | 711/133 |
| 2012/0150818 A1 | 6/2012 | Vijayan Retnamma et al. | |
| 2012/0150826 A1 | 6/2012 | Vijayan Retnamma et al. | |
| 2016/0092115 A1* | 3/2016 | Babu | G06F 3/0611 |
| | | | 711/165 |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 1995/013580 | 5/1995 |
| WO | WO 1999/012098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, New York, US, pp. 1-15 (May 1991).

* cited by examiner

SYSTEMS AND METHODS FOR GRANULAR RESOURCE MANAGEMENT IN A STORAGE NETWORK

RELATED APPLICATIONS

Any and all applications for which a foreign or domestic priority claim is identified in the Application Data Sheet, or any correction thereto, are hereby incorporated by reference into this application under 37 CFR 1.57.

This application is also related to the following patents and pending applications, each of which is hereby incorporated herein by reference in its entirety:

U.S. Pat. No. 6,418,478, titled PIPELINED HIGH SPEED DATA TRANSFER MECHANISM, issued Jul. 9, 2002;

U.S. Pat. No. 7,035,880 titled MODULAR BACKUP AND RETRIEVAL SYSTEM USED IN CONJUNCTION WITH A STORAGE AREA NETWORK, filed Jul. 6, 2000;

U.S. Pat. No. 6,542,972 titled LOGICAL VIEW AND ACCESS TO PHYSICAL STORAGE IN MODULAR DATA AND STORAGE MANAGEMENT SYSTEM;

U.S. patent application Ser. No. 10/658,095 titled DYNAMIC STORAGE DEVICE POOLING IN A COMPUTER SYSTEM, filed Sep. 9, 2002, now U.S. Pat. No. 7,130,970, issued Oct. 31, 2006;

U.S. patent application Ser. No. 10/818,749, titled SYSTEM AND METHOD FOR DYNAMICALLY PERFORMING STORAGE OPERATIONS IN A COMPUTER NETWORK, filed Apr. 5, 2004, now U.S. Pat. No. 7,246,207, issued Jul. 17, 2007;

U.S. patent application Ser. No. 11/120,619, titled HIERARCHICAL SYSTEMS AND METHODS FOR PROVIDING A UNIFIED VIEW OF STORAGE INFORMATION, filed May 2, 2005, now U.S. Pat. No. 7,343,453, issued Mar. 11, 2008;

U.S. Provisional Application No. 60/752,203, titled SYSTEMS AND METHODS FOR CLASSIFYING AND TRANSFERRING INFORMATION IN A STORAGE NETWORK, filed Dec. 19, 2005;

U.S. application Ser. No. 11/313,224 titled SYSTEMS AND METHODS FOR PERFORMING MULTI-PATH STORAGE OPERATIONS, filed Dec. 19, 2005, now U.S. Pat. No. 7,620,710, issued Nov. 17, 2009;

U.S. Provisional Application No. 60/752,196 titled SYSTEMS AND METHODS FOR MIGRATING COMPONENTS ON A HIERARCHICAL STORAGE NETWORK, filed Dec. 19, 2005;

U.S. Provisional Application No. 60/752,202 titled SYSTEMS AND METHODS FOR UNIFIED RECONSTRUCTION OF DATA IN A STORAGE NETWORK, filed Dec. 19, 2005;

U.S. Provisional Application No. 60/752,201 titled SYSTEMS AND METHODS FOR RESYNCHRONIZING STORAGE OPERATIONS, filed Dec. 19, 2005; and U.S. Provisional Application Ser. No. 60/752,197 titled SYSTEMS AND METHODS FOR HIERARCHICAL CLIENT GROUP MANAGEMENT, filed Dec. 19, 2005.

BACKGROUND OF THE INVENTION

Field of the Invention

The inventions disclosed herein relate generally to performing storage operations on electronic data in a computer network. More particularly, aspects of the present invention relate to data transmission schemes used during a storage operation including data pathways and other components used in the transfer of data.

Over time, storage of electronic data has evolved through many forms. During the early development of the computer, data storage was limited to individual computers. Electronic data was stored in the Random Access Memory (RAM) or some other storage medium such as a hard drive or tape drive that was an actual physical part of the individual computer.

Later, with the advent of network computing, storage of electronic data gradually migrated from individual computers to stand-alone storage devices accessible via a network. Over time, these individual network storage devices evolved into more complex systems including networks of tape drives, optical libraries, Redundant Arrays of Inexpensive Disks (RAID), CD-ROM jukeboxes, and other devices. Common architectures included drive pools, which generally are logical collections of drives with associated media groups including the tapes or other storage media used by a given drive pool.

Serial, parallel, Small Computer System Interface (SCSI), or other cables directly connect such stand-alone storage devices to individual computers that are part of a network of other computers such as a Local Area Network (LAN) or a Wide Area Network (WAN). Generally, each individual computer on the network controlled the storage devices that were physically attached to that computer and could also access the storage devices of the other network computers to perform backups, transaction processing, file sharing, and other storage-related operations.

Network Attached Storage (NAS) is another storage scheme using stand-alone storage devices in a LAN or other such network. In NAS, a storage controller computer typically controls the storage device to the exclusion of other computers on the network, but the SCSI or other cabling directly connecting that storage device to the individual controller is eliminated. Instead, storage devices are directly attached to the network itself.

Yet another network storage scheme is modular storage architecture which is more fully described in U.S. Pat. No. 7,035,880 and U.S. Pat. No. 6,542,268. An example of such a software application is the Galaxy™ system, by CommVault Systems of Oceanport, N.J. The Galaxy™ system is a multi-tiered storage management solution which includes, among other components, a storage manager, one or more media agents, and one or more storage devices. The storage manager directs storage operations of client data to storage devices such magnetic and optical media libraries. Media agents are storage controller computers that serve as intermediary devices managing the flow of data from client information stores to individual storage devices. Each storage device may be uniquely associated with a particular media agent and this association may be tracked by the storage manager.

A common feature shared by all of the above-described network architectures is the substantially static relationship between storage controller computers and storage devices. In these traditional network architectures, storage devices are generally connected, virtually or physically, to a single storage controller computer. Generally, only the storage controller computer to which a particular device is physically connected has read/write access to that device. One computer typically cannot control the drive pool and media group be that is being controlled by another. Requests to store and retrieve data from such a drive pool and media group would have to be coordinated by the controlling computer. Typically, storage media reserved or being written to by one media agent cannot be written to be another media agent. Thus, often storage media being used pursuant to one storage policy cannot be used by another storage policy and vice versa often resulting in the inefficient use of storage resources.

In some prior art systems, storage policies may specify alternate data paths or resources in the case device failure or an otherwise unavailable data path. However, such systems typically specify a single alternate data path. Moreover, because backup operations are traditional performed on a client by client basis, each client may store information on different media, resulting in inefficient media use. Furthermore, in many systems, failover conditions often result in the use of additional media further resulting in inefficient use of resources. In addition, alternate data paths are defined in a static fashion, and thus conventional data protection schemes are unable to adapt to changing network conditions.

SUMMARY OF THE INVENTION

In accordance with certain aspects of the present invention, systems and methods are provided for dynamically or automatically selecting and/or modifying data path definitions that are used in performing storage operations. Alternate data paths may be specified or selected that use some or all resources that communicate with a particular destination to improve system reliability and performance. The system may also dynamically monitor and choose data path definitions to optimize system performance, conserve storage media, prevent resource exhaustion and promote balanced load distribution.

In one illustrative embodiment, a method for configuring a storage operation system includes defining a first storage operation path to be used in performing a storage operation. The first storage operation path may specify a destination and substantially all of the resources capable of communicating with the destination. The system may define a second storage operation path used in the storage operation when the first storage path is unavailable.

In an alternate embodiment, a storage operation system may include a management module for controlling or coordinating a storage operation to a destination, a plurality of storage devices, and at least two storage operation paths linking a client to one or more storage devices. The first storage operation path may specify many, most or substantially all of the resources capable of communicating with the destination, while the second storage operation path may be used in the storage operation when the first storage path is unavailable.

In yet another embodiment, a method for consolidating storage policies within a storage operation network is provided which may include, analyzing storage operation paths, which may defined in storage policies. Determining whether any of the storage operation paths have common element points and consolidating two or more of the storage policies having at least one common element into a single storage operation policy such that the single storage operation policy supports copy operations to or with the common element point such as a common destination.

Another embodiment includes a system for consolidating storage policies within a storage operation network. The system may include a management module for directing a storage operation to a destination, a plurality of storage devices and a plurality of storage operation paths. The storage operation paths may be defined within a plurality of storage policies and have a series of element points defining locations or resources along the path, ending with the destination. The management module may consolidate two or more of the storage policies having at least one common element point into a single storage policy such that the single storage policy supports copy operations to the common element point.

One embodiment of the present invention includes a method for consolidating storage policies within a storage operation network that includes analyzing a plurality of storage operation paths that are defined in storage policies. This may involve identifying certain inefficiencies in the storage operation paths and reconfiguring the storage operation paths to improve system performance. This may further involve monitoring the storage network for the inefficiencies in the storage network subsequent to redefining the plurality of storage operation paths to determine whether the reconfiguration has achieved the desired effect.

Another embodiment of the present invention includes a system for consolidating storage policies within a storage operation network. The system may include a management component for controlling or coordinating a storage operation to a destination using one of a plurality of storage operation paths defined within a plurality of storage policies. The management component may identify inefficiencies in the storage operation paths and reconfigure or redefine the storage operation paths to correct or improve or the modified inefficiencies. The management component may also monitor the storage network including any reconfigurations subsequent to redefining the storage operation paths to determine whether the reconfigurations provided the desired correct or improvement. If, not, additional analysis and reconfiguration may be performed.

BRIEF DESCRIPTION OF THE DRAWINGS

Aspects of the invention are illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

Detailed embodiments of the present invention are disclosed herein, however, it is to be understood that the disclosed embodiments are merely exemplary of the invention, which may be embodied in various forms. Therefore, specific functional details disclosed herein shall not be interpreted as limiting, but merely as a basis for teaching one skilled in the art to employ the present invention in any specific embodiment.

Figure 1:
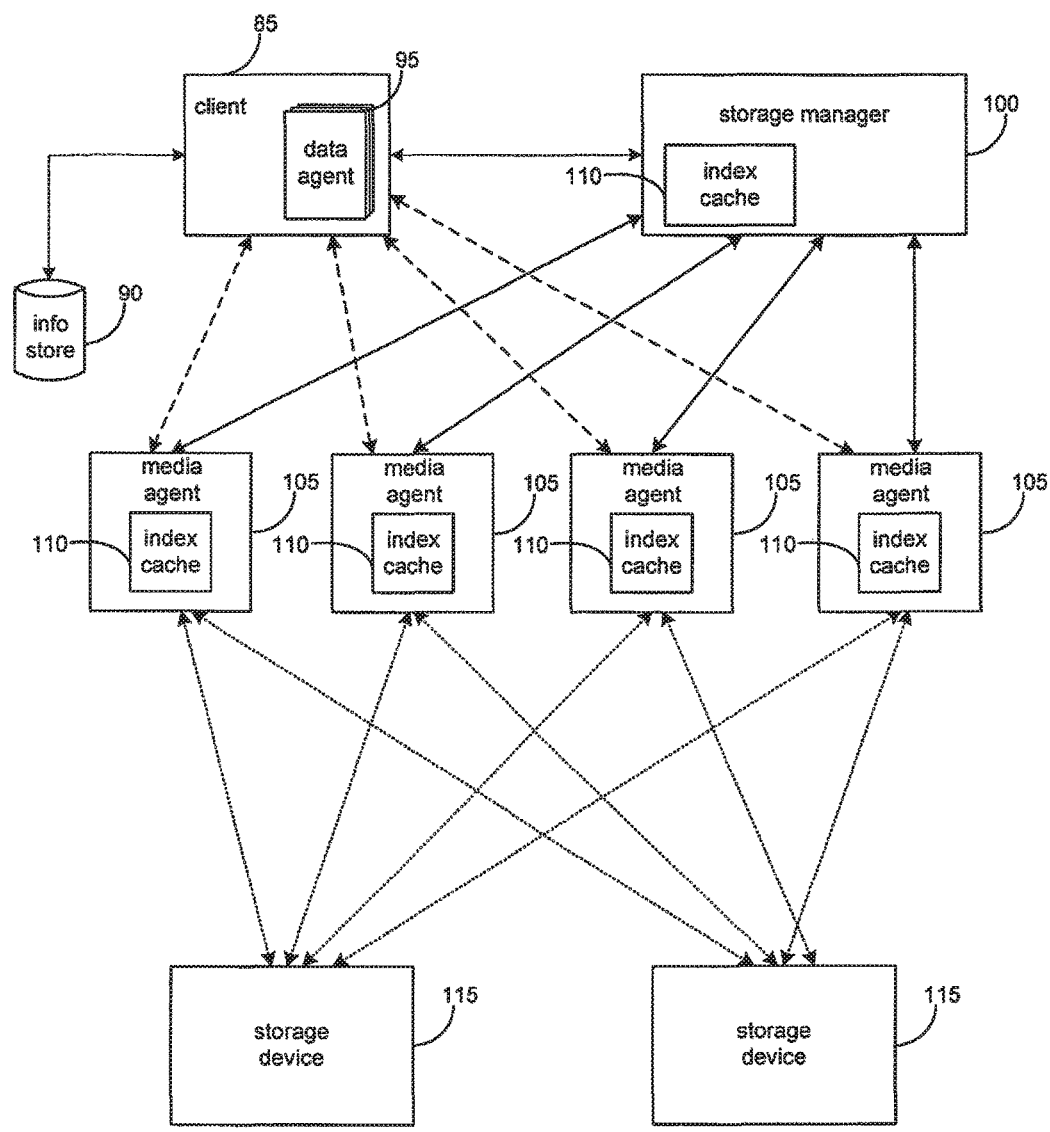
FIG. 1 is a block diagram of a network architecture for a system to perform storage operations on electronic data in a computer network according to an embodiment of the invention.

With reference to FIGS. 1 through 5, representative embodiments of the invention are presented. Turning now to FIG. 1, a block diagram of one network architecture suitable for performing storage operations on electronic data in a computer network according to an embodiment of the invention is shown. The embodiment, as shown, may include a storage management component such as manager 100 and one or more of the following: a client 85, an information store 90, a data agent 95, a media agent 105, an index cache 110, and a storage device 115. The system and elements thereof are exemplary of a three-tier backup system such as the CommVault Galaxy™ backup system, available from CommVault Systems, Inc. of Oceanport, N.J., and further described in U.S. Pat. No. 7,035,880 which is incorporated herein by reference in its entirety.

A data agent 95 is generally a software module that responsible for archiving, migrating, and recovering data of a client computer 85 stored in an information store 90 or other memory location. Each client computer 85 may have one or more data agent(s) 95 and the system can support multiple client computers 85. The system may include a plurality of data agents 95 each of which is intended to backup, migrate, and recover data associated with a different application. For example, different individual data agents 95 may be designed to handle Microsoft Exchange® data, Lotus Notes® data, Microsoft Windows 2000® file system data, Microsoft Active Directory Objects® data, and other types of data known in the art.

In the case where a client computer 85 has two or more types of data, a dedicated data agent 95 may be used for each data type to archive, migrate, and restore the client computer 85 data. For example, to backup, migrate, and restore all of the data on a Microsoft Exchange 2000® server, the client computer 85 would use one Microsoft Exchange 2000® Mailbox data agent 95 to backup the Exchange 2000® mailboxes, one Microsoft Exchange 2000® Database data agent 95 to backup the Exchange 2000® databases, one Microsoft Exchange 2000® Public Folder data agent 95 to backup the Exchange 2000® Public Folders, and one Microsoft Windows 2000® File System data agent 95 to backup the client computer's 85 file system. These data agents 95 would be treated as four separate data agents 95 by the system even though they reside on the same client computer 85.

In some embodiments, however, multipurpose or generic data agents, may be used that operate on multiple data without types. For example, one data agent may operate on Microsoft Exchange 2000® Mailbox and Microsoft Windows 2000® File System data, etc.

Storage manager 100, in one embodiment, may be implemented as a software module or application that coordinates and controls various aspects of the system shown in FIG. 1. For example, storage manager 100 may communicate with some or all elements of the system including client computers 85, data agents 95, media agents 105, and storage devices 115, to schedule, initiate, manage and coordinate system backups, migrations, and data recoveries.

In one embodiment, a media agent 105 is may be implemented as a software module that conducts data, as directed by storage manager 100, between the client computer 85 and one or more storage devices 115 such as a tape library, a magnetic media storage device, an optical media storage device, or other storage device known in the art. For example, as shown in FIG. 1, storage manager 100 may direct data agents 95 to copy data from one or more clients 85 to storage device 115 through media agents 105. In some embodiments, media agent 105 communicates with and controls the storage device 115.

For example, media agent 105 may instruct storage device 115 to use a robotic arm or other means to load or eject a media cartridge, to archive, migrate, or restore data to or from certain media present in device 115. Media agents 105 may also communicate with the storage devices 115 via a local bus such as a SCSI adaptor, or other suitable connection means. In other implementations, storage device 115 may communicate to the data agent 105 via a Storage Area Network ("SAN").

Each media agent 105 may maintain an index cache 110 which stores the index data the system generates during backup, migration, and restore storage operations as further described herein. For example, storage operations for Microsoft Exchange® data generate index data containing the location and other information such as metadata regarding the data on the storage device 145 the Exchange data is stored on.

Index data provides the system with an efficient mechanism for locating user files or data for recovery operations. This index data is generally stored with the data backed up to the storage device 115. The media agent 105 that controls the storage operation may also write an additional copy of the index data to its index cache 110. The data in media agent 105 and index cache 110 is thus readily available to the system for use (in storage and retrieval operations and other activities) without having to be first retrieved from a storage device 115.

Storage manager 100 also maintains an index cache 110. Such index data may include logical associations between components of the system, user preferences, metadata regarding application data or user preferences, management tasks, and other useful data. For example, the storage manager 100 may use its index cache 110 to track the logical associations between media agents 105 and storage devices 115.

Index caches 110 typically reside on their corresponding storage component's hard disk or other fixed storage device. Like any cache, the index cache 110 has finite capacity and the amount of index data that can be maintained directly corresponds to the size of that portion of the disk that is allocated to the index cache 110. In one embodiment, the system may manage the index cache 110 on a least recently used ("LRU") basis as known in the art. When the capacity of the index cache 110 is reached, the system may overwrite those files in the index cache 110 that have been least recently used with the new index data. In some embodiments, before data in the index cache 110 is overwritten, the data may be copied to an index cache copy and stored on a storage device 115. If a recovery operation requires index data that is no longer stored in the index cache 110, such as in the case of a cache miss, the system may recover the index data from the copy stored in storage device 115.

In some embodiments, components of the system may reside and execute on the same computer. In alternative embodiments, a client computer 85 component such as a data agent 95, a media agent 105, or a storage manager 100 may coordinate and direct local archiving, migration, and retrieval of application functions as further described in U.S. Pat. No. 7,035,880. Thus, client computer 85 component can function independently or together with other similar client computer 85 components.

Figure 2:
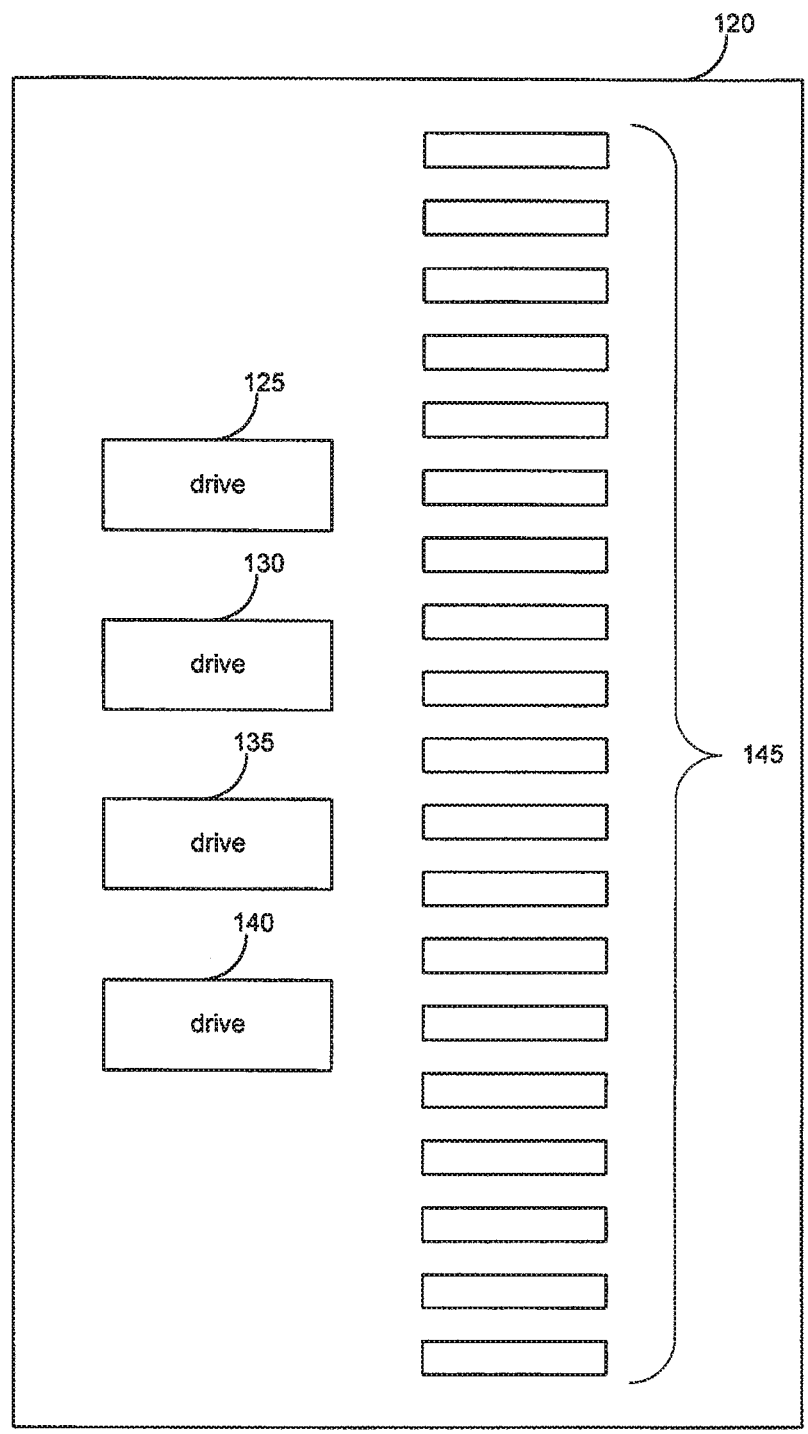
FIG. 2 is a block diagram of an exemplary media storage device for performing storage operations on electronic data in a computer network according to an embodiment of the invention.

Turning now to FIG. 2, a block diagram of an exemplary media library storage device 120 for performing storage operations on electronic data in a computer network according to an embodiment of the invention is presented. Media library device 120 represents one specific type of storage device 115 (FIG. 1) that may be used with an implementation of the invention.

Media library storage device 120 may contain any suitable magnetic, optical or other storage media 145 and associated drives 125, 130, 135, and 140. Media 145 may store electronic data containing backups of application data, user preferences, metadata, system information, and other useful information known in the art. Drives 125, 130, 135 and 140 are used to store and retrieve electronic data from media 145. In one embodiment, drives 125, 130, 135 and 140 may function as a drive pool, as further described in application Ser. No. 10/658,095 which is hereby incorporated herein by reference in its entirety. A drive pool is a logical concept that associates drives and storage media with a storage policy and a source device such as a client 85. Storage policies representing storage patterns and preferences are more fully discussed in U.S. Pat. No. 6,542,972 which is hereby incorporated by reference herein in its entirety.

A drive pool may be identified by a set of drives within a library storage device 120 as pointed to by one or more media agents 105. For example, a drive pool known as DP1 consisting of drives 125 and 130 in library 120 known as LIB1 may be associated by a storage policy, with a first media agent 105 MA1 in an index cache 110 entry as follows: LIB1/MA1/DP1. A second drive pool consisting of drives 130, 135, and 140 within the library storage device 120 associated with the same media agent 105 may be expressed in index cache 110 as follows: LIB1/MA1/DP2.

As further described herein, the present invention permits logical association of drive pools associated with different media agents 105 (FIG. 1). Multiple drive pools, media agents, and other system components can be associated in a single index cache 110 entry. Thus, for example, an index cache 110 entry for a storage policy, according to an embodiment of the present invention, may combine the two previous entries instead and thus may be logically represented as: ##STR1##

In addition and as further described herein, media 145 may be associated by the system with drive pools or storage policies, and not necessarily with individual drives 125, 130, 135 and 140. A media group may be a collection of media 145 or other storage media assigned to a specific storage policy. The media group may dynamically point to different drive pools as further described herein, including those with different recording formats as the system may update the recording format of the media group in a media group table stored in an index cache 110.

Aspects of the present invention, as further described herein, permit data associated with a particular storage policy copy to be stored on and share certain media 145. Data from each storage policy copy may be appended to media 145 shared by other storage policy copies. Thus, a storage policy copy may be shared between several media agents 105 in a dynamic drive pooling environment with media 145 also being shared by the different media agents 105 and storage policies. Media 145 can be located in virtually any storage device 115 and for a given storage policy copy may be spread across multiple storage devices 115. Thus, an index cache entry may associate multiple media sets 145 with multiple media agents, storage policies, drive pools, and other system components. For example, two different media sets from the previous example of index entries might be associated in a single index cache 110 entry as follows: TABLE-US-00001 storage policy1: media agent1: drive pool1: media set1: media set2 storage policy2: media agent2: drive pool2: media set1: media set2.

In addition to media sets, a single index cache 110 entry may also specify and associate multiple media agents 105, storage policies, drive pools, network pathways, and other components.

While the embodiments described above employ the use of two drive pools and two media agents, one skilled in the art will recognize that additional media agents and logical drive pools may be implemented across the storage policies without deviating from the scope and spirit of the present invention.

Figure 3:
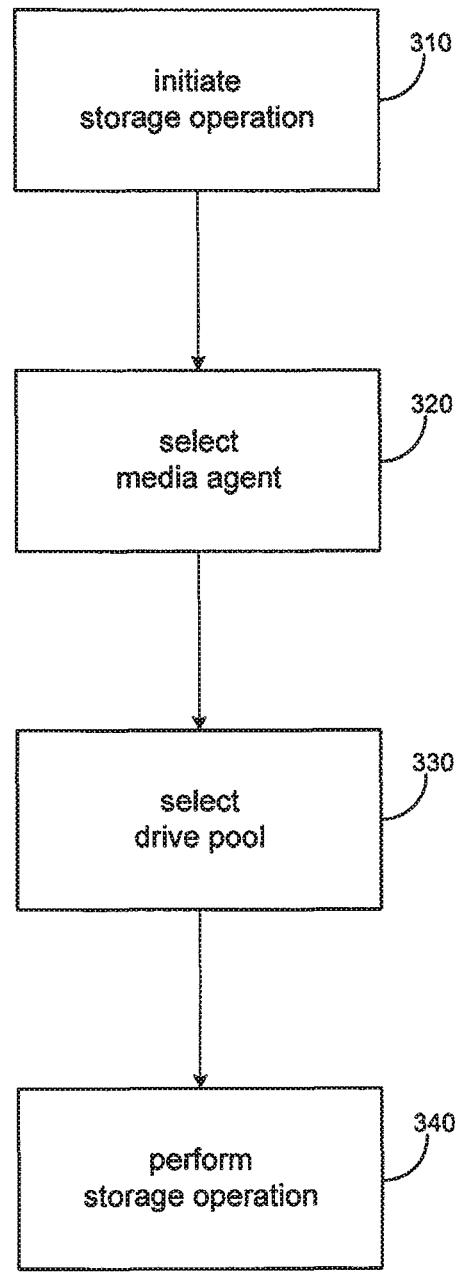
FIG. 3 is a flow chart illustrating some of the steps of a storage operation in accordance with an embodiment of the invention.

Tuning to FIG. 3, a flow chart 300 illustrating some of the steps involved in performing storage operations on electronic data in a computer network according to an embodiment of the invention is shown. Selection of desired storage components for storage operations may be performed manually or automatically in dynamic fashion. In operation, the system may initiate a storage operation in response to a scheduled procedure or as directed by a user, system administrator, or as otherwise directed by the system (step 310).

For example, the system may initiate a backup operation or a restore operation at a specific time of day or in response to a certain threshold being exceeded as specified in a storage policy. The system may select a media agent 105 (FIG. 1) according to selection logic or a specified data path as further described herein (step 320). The selection logic and data paths may determined by a set of criteria defined in the storage policies or according to system configuration or operational rules or guidelines. Examples of such criteria may include, load balancing within the network, bandwidth use and efficiency, media usage, available media space, etc.

In one illustrative embodiment, the selection logic includes the ability to conduct a LAN-free storage operation, such as using a SAN, when it is desired to optimize storage operations via load balancing. For example, an index entry in index cache 110 may associate certain media agents 105, storage devices 115, or other components with LAN-free storage operations either via user input, network topology detection algorithms known in the art, or other methods. As another example, the system may select a free media agent 105 to optimize storage operations via load balancing when a default media agent 105 or other media agent 105 specified in a storage policy is already performing other storage operations or otherwise occupied. The system may also select an appropriate drive pool in a network storage device according to selection logic further described herein (step 330). Once the system has selected an appropriate media agent and drive pool, the storage operation is performed, using the selected storage components (step 340).

Another embodiment of the present invention allows storage policies to be recognized or be defined in terms of sub-clients (e.g., processes or portions of data of a volume that are mutually exclusive) and have data protection operations performed at the sub-client level. For example, a storage policy may specify a path similar to those described above for each sub-client operating on a client. In some embodiments, storage policies associated with each sub-client specify a default data path and one or more alternate data paths. These illustrative paths, in one embodiment may be expressed as follows:

Default: media agent 1: library 1

Alternate: media agent 2: library 1

Alternate data paths are desirable as they provide additional means by which a storage operation may be completed and thus improve system reliability and promote robust operation. Thus, the system may automatically select certain available alternate data paths to facilitate load balancing and failover recovery. Such alternate data paths may be specified using some or all of the additional routing resources available in the system. For example, the alternate data path above may specify as alternates some or all of the media agents in the system that are capable of communicating with library 1 and may be expressed as follows:

Alternate: media agent 2; media agent 3; . . . media agent n: library 1

Where 'n' is the total number of media agents specified in the alternate data path.

This arrangement allows the system to take advantage of other available routing resources, providing the ability to select from multiple data paths to the desired destination. Using one approach, a storage policy may specify all of the media agents 105 in the system capable of communicating with a particular destination (e.g., library 1). This provides the greatest likelihood that a storage operation will be completed, assuming that at least some storage resources are functioning or not otherwise congested.

Using another approach, some of the available routing resources, such as media agents 105, may be specified as alternates, providing a greater likelihood that the storage operation will be completed, rather than relying on a single alternate. Such alternate resources may be selected based on the degree of utilization, capacity, bandwidth, physical location, the desired confidence factor or other considerations and may be specified manually or assigned automatically based on data protections goals specified for the system.

In addition, alternate data paths may be specified in many ways to provide robust routing options. For example, alternate data paths may be specified according to user preferences. A system administrator may specify certain alternate data paths and the priority and/or order in which the data paths are to be used. Another method for providing alternate data paths may involve using the "round robin" approach in which alternate data paths are selected from a group of available data paths such that each alternate data path is selected and used before any previously used data path is selected and used again. This approach is typically useful in promoting load balancing within the system as it tends to spread out data transfer operations across available data paths in a substantially uniform fashion. Other approaches may include specifying alternate data paths to emphasize the ability to complete a storage operation in the event of a failover condition.

In certain embodiments, alternate data paths may be specified such that data from one client or sub-client may be routed to a particular destination through substantially every available data path that may potentially link the client or sub-client to the destination. Similarly, alternate data paths may be defined such that data is restored to particular client, sub-client or computing device from some or all storage devices within the system. This arrangement provides significant flexibility within the system for performing and completing both storage and restore operations.

Similarly, in some embodiments, alternate destinations may be specified and used in failover or other emergency data protection operations. For example, a storage policy may specify a data path including library 1, library 2, and others, with the provision that the specified media agents have access to each of the specified libraries. In some embodiments, media agents specified in such data paths may share an index cache.

One benefit of the arrangement described above is the ability to conserve media within a storage system. In some embodiments, storage policies may not have the ability to share storage media due to certain conflicts within programming logic or the need for storage policies to resolve any such conflicts in mutually exclusive manner to ensure computational integrity. Thus, storage operations performed pursuant to different storage policies are generally required to write to different media, often resulting in the inefficient use of media.

For example, a client may communicate to a storage device 115 through a first media agent 105 pursuant to a first storage policy and a second client may communicate to the same storage device pursuant to a second storage policy and a second media agent. In this case, each communication or storage operation by each media agent may be written to different media in the storage device due to programming constraints. Moreover, when a failover condition occurs, further communications to the storage device may be written to a third media based on the alternate data path definitions, resulting in an even higher media usage rate.

An aspect of the present invention streamlines this process by specifying data paths on a sub-client basis and creating a complimentary storage policy based on this information to avoid the logical conflict described above, or any other logical conflict that may exist. Moreover, this arrangement allows multiple clients (and associated sub-clients) to use the same storage policy, significantly reducing the number of storage policies required to manage the system as well as simplifying the process involved in updating or changing the policies themselves. This also facilitates updating and/or changing the client associations with storage policies that control or otherwise specify particulars involved in data movement.

Additionally, two groups of clients may specify two sets of client or sub-client data paths (e.g., a default and alternate for each), but, may be governed by a single storage policy in accordance with one embodiment of the present invention. This may be accomplished by examining the data paths and combining or rearranging them into a suitable form for use in the storage policy. For example, a first group of sub-clients may specify the following data paths:

Default data path: Media agent 1: library 1

Alternate data path: Media agent 2: library 1

The second group of sub-clients may specify the following data paths:

Default data path: Media agent 2: library 1

Alternate data path: Media agent 1: library 1

These may be examined and modified (or combined and rearranged) to specify or point to a single storage policy with data paths as expressed below which takes into account the data path preferences of each sub-client while eliminating the need for two separate storage policies:

Default data path: Media agent 1: library 1

Alternate data path: Media agent 2: library 1

In operation, the system may consult this modified storage policy (default first and alternate second) to obtain data path preferences when moving data from the first set of clients. When moving data from the second set of clients, this storage policy may be consulted in reverse order, thus preserving the original preferences (i.e., Media agent 2 as the default with Media agent 1 as the alternate). Using this single storage policy arrangement, data from various storage operations may be written to the same media, rather than using separate media as explained above, promoting media conservation. Moreover, specifying data paths on a sub-client level allows multiple clients to write data to the same media and avoids the potential logical conflicts described above.

Another embodiment in accordance with the present invention includes the case where two client domains separated by a firewall, each domain containing multiple sub-clients. Assume, for example that each domain has set of sub-clients with different data paths as shown below:

Domain 1:
Default data path: Media agent 1: library 1
Alternate data path: Media agent 2: library 1
Domain 2:
Default data path: Media agent 3: library 1
Alternate data path: Media agent 4: library 1

As in the example above, media agent utilization will increase if two storage policies are used to manage this arrangement. Thus, in accordance with an embodiment of the present invention, these data paths may be modified (or combined) into one storage policy set forth below having four specified data paths rather than two storage polices with two data paths each, thus maintaining failover protection and promote minimum media utilization:

Media agent 1: library 1; Media agent 2: library 1
Media agent 3: library 1; Media agent 4: library 1

When moving data from the first domain, the first entry is consulted and vice versa for the second domain which allows information from both domains to be written to the same media, promoting efficient media utilization. This order of operations may be defined within the storage policy or may be specified by placing the appropriate pointers or other referential elements in an index or other entry that governs data path preferences.

Another benefit of the present invention includes the ability to use a single storage policy to govern multiple clients. This provides users with significant flexibility by allowing them to define a storage policy and "point" to that policy through referential elements to multiple clients, thereby simplifying system administration.

For example, in the case where one or more clients need to have changes or modifications made to an associated storage policy, with the provided arrangement, a single policy may be changed having a global effect rather than requiring a similar change be made to multiple individual polices. Moreover, clients may easily be assigned or moved from one storage policy to another merely by changing a pointer or other referential element. This eliminates having to copy, significantly modify, change or create a new storage policy from scratch. Further, storage policies are no longer defined and associated on an individual client by client basis.

In one embodiment, storage policies and associated storage domains may be associated with one another based on system configuration, user needs, or other considerations. This process may be performed either manually, automatically, or may be partially automated, requiring certain user input such as customization information, intended or expected use, etc. For example, at system setup a configuration program may walk an administrator through a configuration program and prompt the user for certain customization information. In alternative embodiments, this process may be predominantly or completely automated based on certain specific goals including, but not limited to, efficient media usage, degree of desired data protection, and substantially even and/or efficient load distribution.

Figure 4:
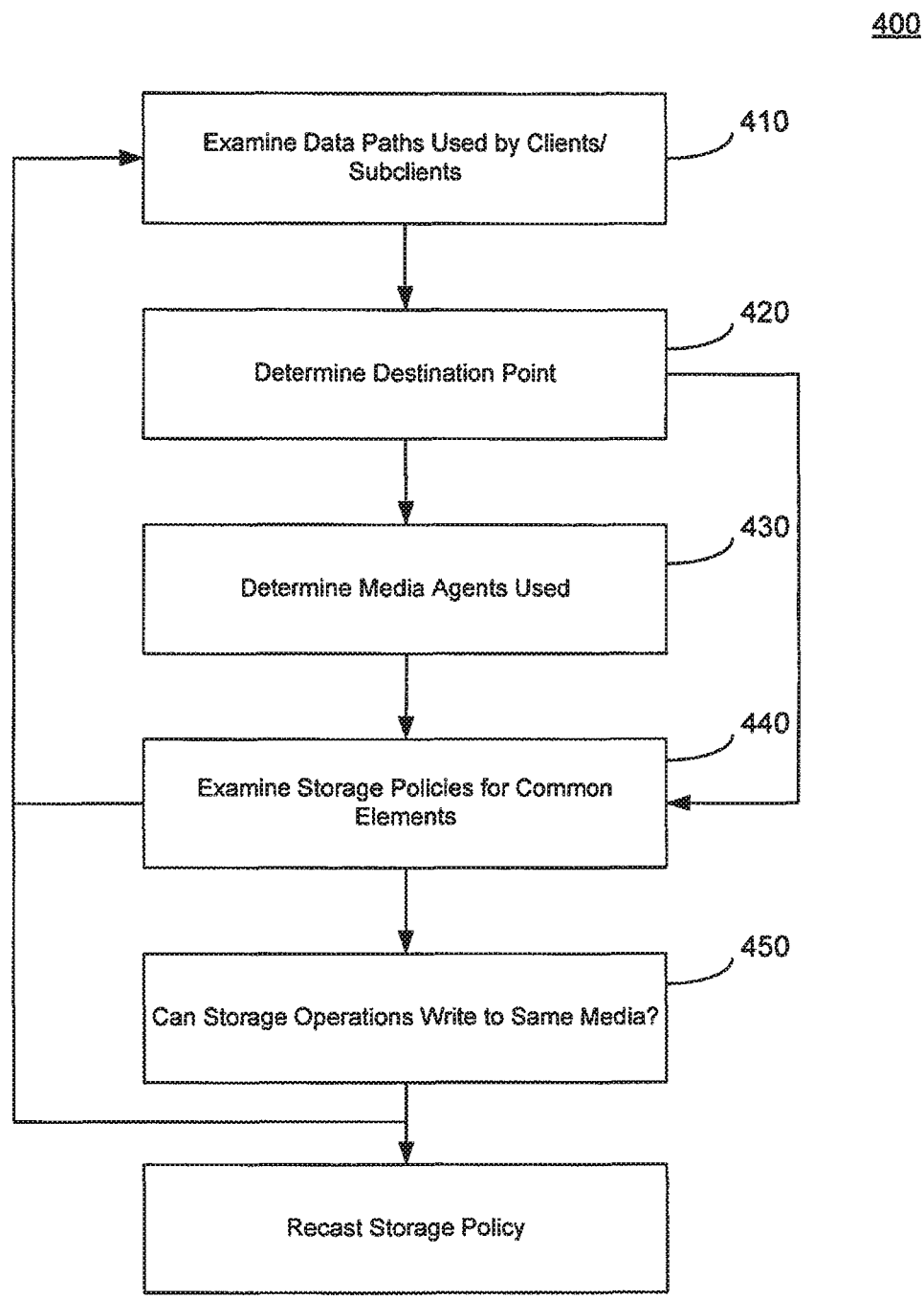
FIG. 4 is a flow chart illustrating some steps of assigning storage policies to system resources and evaluating existing storage policies of in accordance with an embodiment of the invention.
Figure 5:
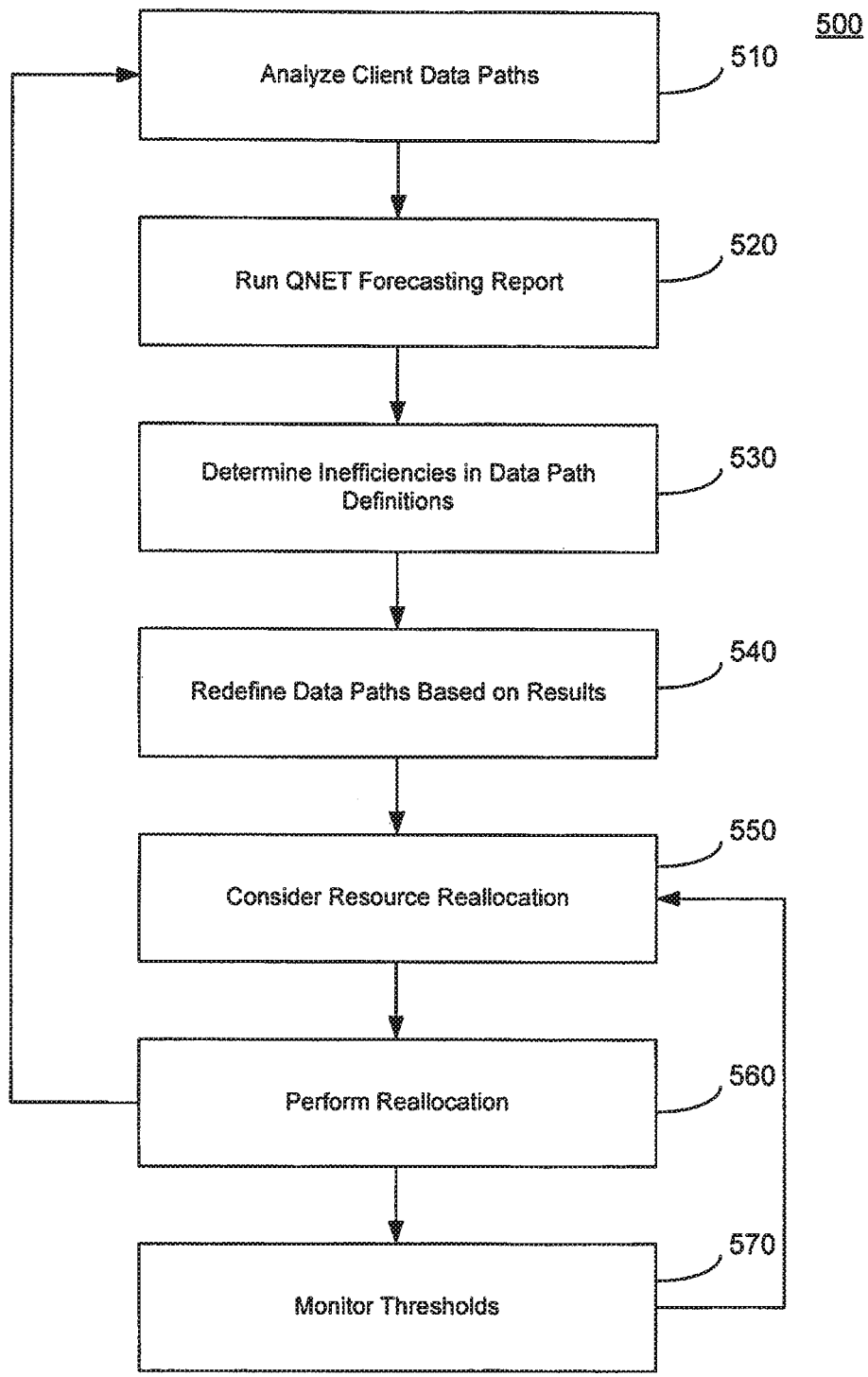
FIG. 5 is a flow chart illustrating some of the steps of a method of dynamically analyzing and managing storage policies and data paths in accordance with an embodiment of the invention.

Flowchart 400 of FIG. 4 illustrates some of the steps involved in assigning storage policies to system resources or in evaluating existing storage polices for possible consolidation as part of an ongoing effort to analyze and increase system efficiency.

As shown, at step 410 any existing storage polices or defined data paths for performing storage operations may be retrieved, examined and analyzed. This may involve, for example, retrieving path information from an index cache associated with a media agent or master storage manager or retrieving similar information from a metabase that may be associated with such components. The analysis may include examining data path information such as origination point (e.g., clients and/or sub-clients), destination point (storage device, library, media pool, etc.), transmission resources scheduled to be involved including media agents, data conduits and other transmission elements. In some embodiments, this may involve the creation of a system wide or more limited process-based netlist to obtain a basic understanding of system routing options and transmission patterns and preferences.

At step 420, the system may determine whether any identified clients or sub-clients have a common destination point. The destination points are typically defined as a storage device for receiving data from copy operations representing the last location of data at the completion of a particular copy operation. A list of origination points (e.g., clients and or media agents) and common destination points may be compiled as a starting point to determine similarities between various identified data paths that may be suitable for combination or rearrangement into one or more storage policy to improve overall system efficiency and/or reduce media consumption. Next, at step 430, media agents and other data transfer resources may be associated with the list to generate a more complete picture of the routes and resources involved/available in traversing the data paths between origination and destination points. At this point, the netlist may be substantially complete taking into account available routing and resource information.

At step 440, the system examines any pre-existing or identified storage polices and compares them with other storage polices and the information generated at step 430 to identify common elements that may be combined or folded into the existing storage policies. This may also involve identifying and comparing clients/sub-clients with common origination points and correlating them with storage polices having common destination points as a basis for potentially creating new storage polices. Other information of interest may include identifying common media agents and associated destination points, etc. for similar reasons.

Next, at step 450, it may be determined whether any identified common elements are precluded from writing information to the same storage device and/or storage media. If so, in some embodiments, these elements may be noted on a list of items not suitable for combination to into storage polices and may be identified as needing individual treatment. The gathered information may be analyzed to determine if the number of storage polices may be reduced by combining common elements, by combining or modifying existing storage polices, or by recasting storage polices with other identified data paths into more efficient storage pathways (step 460).

For example, the analysis may reveal four existing storage polices that have many common elements. Depending on the management goals of the storage system, these four storage polices may be combined into one comprehensive storage policy with a common destination if minimal media usage is desired or may be combined into two storage polices to minimize the possibility of alternate data path congestion.

Other analysis results may reveal several sub-client data path definitions that can be combined into a new storage policy to reduce media usage without substantially affecting storage device accessibility. Moreover, although some results may suggest the combination of significant numbers of storage policies or other common data paths, such suggestions may be examined to determine whether overall system performance would be adversely impacted, for example, beyond a preset performance threshold, and if so, may not be implemented even though such combinations may reduce overall media consumption.

In some embodiments of the invention, factors other than media consumption or possible congestion may be taken into account when determining how to create, change or modify storage polices to accommodate certain system management goals. Such considerations may include load balancing, optimization, service level performance or other operational goals including adjustments to account for changes that may occur over time.

A system administrator, for example, may wish to maintain a substantially even workload across the storage network and maintain that distribution on a going forward basis. Other goals may include maintaining operational performance within a certain percentage level to ensure a specified level of data protection or maximizing system efficiency during peak usage periods. Achieving these and other goals may involve the dynamic and periodic redefinition of data paths and associated storage policies Turning now to FIG. 5, a flow chart 500 illustrating some of the steps involved with the dynamic analysis and potential redefinition of storage policies/selection of alternate data paths in accordance with aspects of the present invention is illustrated. At step 510, client/sub-client data paths within the system are analyzed similarly to step 410 described above in connection with FIG. 4. Next, at step 520, with the data paths identified, certain system performance and forecasting reports may be run as described in co-pending, commonly assigned cases entitled Systems and Methods for Allocation of Organizational Resources Application, and Hierarchical Systems and Methods for Providing a Unified View of Storage Information, Ser. No. 11/120,619, filed May 2, 2005, which are hereby incorporated by reference in its entirety. Such reports may forecast, based on past performance or other parameters, how resource utilization may grow or otherwise change and predict how capacity, efficiency, failure rates, and traffic load may impact storage operations over time.

Based on the forecasting information, the system analyzes, at step 530, data paths to identify which ones are susceptible to or likely to experience an adverse impact due to the changing conditions (e.g., based on predefined thresholds or resource capacity). Such data path definitions or storage policies may then be modified on a dynamic basis to accommodate or otherwise account for predicted conditions to minimize impact (step 540). For example, if it is determined that certain data paths are expected to become congested after a certain period of time, additional alternate data paths expected to handle the additional load may be added before that point is reached or other alternate data paths that do not suffer from the same conditions are specified.

If certain media agents that serve particular storage devices are expected to become overloaded or constantly busy at or near capacity, additional alternate media agents may be added by combining or otherwise altering storage policy data paths to help reduce the adverse impact of the anticipated problem (e.g., other alternate data paths not suffering from the same or similar conditions may be selected or added to help alleviate any detected or predicted problem).

Moreover, data paths may be changed on a dynamic basis to balance load, maintain a substantially constant data load, or prevent a failover condition in accordance with user specifications or system requirements. In certain embodiments this may involve distributing work load across several communication paths as described in commonly assigned, co-pending case entitled Systems and Methods for Providing Multipath Storage Network, filed on Dec. 19, 2005, and which is hereby incorporated by reference in its entirety.

Next at step 550, resource reallocation is considered if data path adjustment is not sufficient to correct or acceptably minimize any anticipated problem. This may involve, for example, allocating additional storage resources such as media agents, data paths, and storage devices, etc. from other storage operation cells, as described in commonly assigned, co-pending case entitled Systems and Methods for Migrating Components on a Hierarchical Storage Network, application Ser. No. 60/752,196, filed on Dec. 19, 2005, and which is hereby incorporated by reference in its entirety. If deemed helpful, the reallocation is performed at step 560 as described in that case. The system may then periodically return to step 510 and perform the process as part of an ongoing recursive effort to maintain or optimize system performance.

In some embodiments, prior to actual reallocation of resources, proposed reallocation scenarios may be simulated and evaluated with the expected results extended over time in order to choose the best solution to any resource shortcoming that best fits enterprise needs or user expectations. Moreover, in some embodiments, any such resource reallocation may need to be approved by an administrator prior to reallocation, which may involve reviewing simulation results and approving reallocations on a component by component or proposal by proposal basis. However, in other embodiments, such resource reallocation may be performed substantially automatically.

Next at step 570, the system monitors performance subsequent to resource reallocation to help confirm the reallocation is providing the desired effect. This may involve monitoring the operation of the actual reallocated resources and/or the system components or processes the reallocation was intended to benefit. If actual operation of the system is not in accordance with expectations and/or simulation results, the system may be quiesced, and the original configuration returned until an analysis may be performed to determine why expected results were not achieved.

In one embodiment, a trouble ticketing system or other notification system, as is known in the art, may be activated to notify the administrator of the failed reallocation. Moreover, in some embodiments, the level of performance may be examined to determine if the reallocation is having the expect level of desired effect. For example, if a particular reallocation is operating within a certain percentage of expectations (e.g., 80%), which may be user defined, the reallocation may be considered acceptable. If not, the reallocation may be considered unacceptable, and the system configuration may be returned to its prior state (automatically or upon user approval).

In some embodiments, the system may monitor or log some or all resource reallocations and subsequent associated performance changes so that the changes may be continually evaluated, used as a basis or model for future changes, and as a basis for returning some or all of the system to prior configurations. Moreover, this information may act as a template for future system provisioning and deployment and evaluating the operation of selected system software or hardware components.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for consolidating storage policies within a storage operation network, the method comprising:
    accessing a first storage policy of a plurality of storage policies, the first storage policy comprising at least a first storage operation path that associates at least a first media agent with a first storage device in a first relationship;
    accessing a second storage policy of the plurality of storage policies, the second storage policy comprising at least a second storage operation path that associates a second media agent with the first storage device in a second relationship, wherein the second media agent conducts data to the first storage device via the second storage operation path;
    automatically evaluating with one or more computer hardware processors, the first and second storage policies and the first and second relationships to determine that both the first and second storage policies use both the first and second storage operation paths to conduct data to at least the first storage device;
    consolidating the first and second storage policies into one comprehensive storage policy, wherein the comprehensive storage policy associates at least the first and second storage operation paths to the first storage device, wherein both the first and second storage paths of the comprehensive storage policy conduct data to at least the first storage device; and
    automatically adding at least a third storage operation path to the comprehensive storage policy based on one or more network operating conditions that is predicted to occur, wherein the third storage operation path is an alternate data path that is different than the first and second storage operation paths.

2. The method of claim 1 wherein the one or more network operating conditions comprise at least one of the group consisting of: data transfer rate, load balancing, resource exhaustion, transmission congestion, or performance optimization.

3. The method of claim 1 wherein automatically evaluating the first and second storage policies is based at least in part whether the first and second storage policies share a common destination point.

4. The method of claim 1 wherein information about the first and second storage operation paths is obtained from an index cache.

5. The method of claim 1 wherein information about the first and second storage operation paths is obtained from a metabase.

6. The method of claim 1 wherein automatically evaluating the first and second storage policies is based at least in part on one of the group consisting of: origination point, destination point, transmission resources scheduled to be involved, and a process-based netlist.

7. The method of claim 1 wherein the one or more network operation conditions comprises forecasting network usage.

8. The method of claim 1 wherein automatically evaluating the first and second storage policies is based at least in part on which storage operation paths are likely to experience an adverse impact due to changing conditions.

9. The method of claim 1 wherein dynamically adding the third storage operation path is based at least in part on maintaining a substantially constant data load.

10. The method of claim 1 wherein dynamically adding the third storage operation path is based at least in part on preventing a failover condition.

11. A storage operation system comprising:
    a plurality of storage devices;
    a plurality of storage policies;
    a first media agent executing in one or more computer hardware processors, the first media agent configured to manage the flow of data to at least a first storage device based on a first storage policy of the plurality of storage policies, wherein the first storage policy defines a first storage operation path that associates the first media agent and the first storage device in a first relationship;
    a second media agent executing in one or more computer hardware processors, the second media agent configured to manage the flow of data to the first storage device based on a second storage policy of the plurality of storage policies, wherein the second storage policy defines a second storage operation path that associates the second media agent and the first storage device in a second relationship; and
    a management component executing in one or more computer hardware processors, the management component configured to:
        automatically evaluate the first and second storage policies and the first and second static relationships to determine that both the first and second storage policies use both the first and second storage paths to conduct data to at least the first storage device;
        consolidate the first and second storage policies into one comprehensive storage policy, wherein the comprehensive storage policy associates at least the first and second storage paths to the first storage device, wherein both the first and second data paths of the comprehensive storage policy conduct data to at least the first storage device; and
        automatically add at least a third storage operation path to the comprehensive storage policy based on one or more network operating conditions that is predicted to occur, wherein the third data path is an alternate data path this is different than the first and second storage operation paths.

12. The system of claim 11 wherein the one or more network operating conditions comprise at least one of the group consisting of: data transfer rate, load balancing, resource exhaustion, transmission congestion, or performance optimization.

13. The system of claim 11 wherein the management component is configured to automatically evaluate the first and second storage policies based at least in part whether the first and second storage policies share a common destination point.

14. The system of claim 11 wherein the management component is configured to obtain information about the first and second storage operation paths from an index cache.

15. The system of claim 11 wherein the management component is configured to obtain information about the first and second storage operation paths from a metabase.

16. The system of claim 11 wherein the management component is configured to automatically evaluate the first and second storage policies based at least in part one of the group consisting of: origination point, destination point, transmission resources scheduled to be involved, and a process-based netlist.

17. The system of claim 11 wherein the one or more network operation conditions comprises a forecast of network usage.

18. The system of claim 11 wherein the management component is configured to automatically evaluate the first and second storage policies based at least in part on which storage operation paths are likely to experience an adverse impact due to changing conditions.

19. The system of claim 11 wherein the management component is configured to dynamically add the third operation path based at least in part on maintaining a substantially constant data load.

20. The system of claim 11 wherein the management component is configured to dynamically add the third storage operation path based at least in part on preventing a failover condition.

* * * * *